US011877286B2

(12) United States Patent
Yue et al.

(10) Patent No.: US 11,877,286 B2
(45) Date of Patent: Jan. 16, 2024

(54) METHOD AND SYSTEM FOR PROCESSING SCHEDULING REQUESTS

(71) Applicant: VIVO MOBILE COMMUNICATION CO., LTD., Guangdong (CN)

(72) Inventors: Ran Yue, Chang'an Dongguan (CN); Yumin Wu, Chang'an Dongguan (CN); Xiaodong Yang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 87 days.

(21) Appl. No.: 16/611,020

(22) PCT Filed: May 2, 2018

(86) PCT No.: PCT/CN2018/085352
§ 371 (c)(1),
(2) Date: Nov. 5, 2019

(87) PCT Pub. No.: WO2018/202044
PCT Pub. Date: Nov. 8, 2018

(65) Prior Publication Data
US 2020/0187234 A1 Jun. 11, 2020

(30) Foreign Application Priority Data
May 5, 2017 (CN) .......................... 201710312470.5

(51) Int. Cl.
*H04W 72/21* (2023.01)
*H04L 5/00* (2006.01)
(Continued)

(52) U.S. Cl.
CPC ........... *H04W 72/21* (2023.01); *H04L 1/1642* (2013.01); *H04L 5/0051* (2013.01);
(Continued)

(58) Field of Classification Search
None
See application file for complete search history.

(56) References Cited

U.S. PATENT DOCUMENTS

2012/0100864 A1   4/2012 Susitaival et al.
2014/0204800 A1   7/2014 Moulsley
(Continued)

FOREIGN PATENT DOCUMENTS

CN   101795497 A    8/2010
CN   102271417 A  * 12/2011   ........ H04W 74/0833
(Continued)

OTHER PUBLICATIONS

3GPP TSG-RAN WG2 (May 15-19, 2017) R2-1704589, Enhance SR in NR, 2017 (Year: 2017).*
(Continued)

*Primary Examiner* — Yemane Mesfin
*Assistant Examiner* — Jeff Banthrongsack
(74) *Attorney, Agent, or Firm* — Maschoff Brennan

(57) ABSTRACT

The present disclosure provide a methods and a system for processing an SR. The method includes: as for a current logical channel/logical channel group, when detecting that SR count reaches a maximum number of times of SR transmission of the current logical channel/logical channel group, releasing Physical Uplink Control Channel (PUCCH) resources on the numerology/TTI type corresponding to a current SR; when Sounding Reference Signal (SRS) resources are configured on the numerology/TTI type corresponding to the current SR, releasing the SRS resources; when downlink allocation and/or uplink grant resources are configured on the numerology/TTI type corresponding to the current SR, releasing the downlink allocation and/or uplink grant resources.

17 Claims, 5 Drawing Sheets

(51) Int. Cl.
H04W 74/08 (2009.01)
H04W 72/23 (2023.01)
H04L 1/1607 (2023.01)
H04L 27/26 (2006.01)

(52) U.S. Cl.
CPC ........ *H04L 5/0082* (2013.01); *H04L 27/2607* (2013.01); *H04W 72/23* (2023.01); *H04W 74/0833* (2013.01)

(56) References Cited

U.S. PATENT DOCUMENTS

| | | | | |
|---|---|---|---|---|
| 2017/0353972 | A1* | 12/2017 | Babaei | H04W 72/02 |
| 2018/0270698 | A1* | 9/2018 | Babaei | H04W 28/0278 |
| 2018/0317123 | A1* | 11/2018 | Chen | H04W 72/0413 |

FOREIGN PATENT DOCUMENTS

| | | | |
|---|---|---|---|
| CN | 102271417 A | 12/2011 | |
| CN | 102474880 A | 5/2012 | |
| CN | 103327613 A | 9/2013 | |
| EP | 3 527 026 | 8/2019 | |
| EP | 3527026 B1 * | 7/2020 | ............ H04W 24/10 |
| WO | 2018/204770 A1 | 11/2018 | |
| WO | 2018/204770 A4 | 11/2018 | |

OTHER PUBLICATIONS

European Search Report in Application No. 18793919.4 dated Mar. 30, 2020.
CN Office Action in Application No. 201710312470.5 dated May 15, 2019.
CN Search Report in Application No. 201710312470.5 dated Apr. 25, 2019.
"Logical Channel Prioritization with Multiple Numerologies for NR", 3GPP TSG-RAN WG2 #97, Feb. 13, 2017.
"Multiple numerology considerations for SR" 3GPP TSG-RAN WG2 #97, Feb. 13, 2017.
"Correct Handling of MAC control information" 3GPP TSG-WG r5 Meeting #46, Feb. 22, 2010.
Written Opinion and International Search Report in Application No. PCT/CN2018/085352 dated Nov. 14, 2019.
VIVO "Enhanced SR in NR." 3GPP TSG-RAN WG2 Meeting #98, R2-1704589, May 6, 2017.

* cited by examiner

METHOD AND SYSTEM FOR PROCESSING SCHEDULING REQUESTS

CROSS-REFERENCE TO RELATED APPLICATION

This application is the U.S. national phase of PCT Application No. PCT/CN2018/085352 filed on May 2, 2018, which claims the benefit and priority of Chinese Application No. 201710312470.5, filed on May 5, 2017. The entire disclosures of the application are incorporated herein by reference.

TECHNICAL FIELD

The present disclosure relates to the field of communication technology, and more particularly to a method for processing scheduling requests and a system for processing scheduling requests.

BACKGROUND

The Long Term Evolution (LTE) system is a scheduling-based communication system. That is, when there is to-be-transmitted data in a cache of a User Equipment (UE), the UE requires transmitting a Buffer Status Report (BSR) to an eNodeB first, to notify the eNodeB of information of to-be-transmitted data in the current cache. After receiving the BSR, the eNodeB allocates corresponding Uplink Shared Channel (UL-SCH) resources for the UE according to amount of data to be transmitted by the UE, and informs the UE to transmit the data on the allocated UL-SCH resources. The UL-SCH resources are also required for the UE to transmit the BSR to the eNodeB. When there is BSR that requires to be reported while there is no UL-SCH resource, the UE requires transmitting a UL Scheduling Request (SR) via a Physical Uplink Control Channel (PUCCH) to request the eNodeB to allocate the UL-SCH resources for the BSR, which is required to be transmitted by the UE.

In the LTE system, a counter is configured for the SR to record the number of times of SR transmission. Meanwhile, the number of times of SR transmission is compared with the maximum number of times of SR transmission configured by the eNodeB for the UE, i.e., dsr-TransMax. When the number of times of SR transmission reaches the maximum number of times of SR transmission dsr-TransMax, the UE informs a Radio Resource Control (RRC) layer to release Physical Uplink Control Channel (PUCCH) resources of all serving cells, release a Sounding Reference Signal (SRS), clear all configured UL and Downlink (DL) grant resources, initiate a random access procedure on a serving cell and cancel all to-be-processed SRs.

In the LTE system of related art, the maximum number of times of SR transmission dsr-TransMax configured by the eNodeB for the UE is the same for all serving cells.

At present, the global Fifth Generation (5G) standard setting institution Third Generation Partnership Project (3GPP) has launched a 5G New Radio (NR) research project, hoping to formulate an Orthogonal Frequency Division Multiplexing (OFDM)-based new 5G wireless air interface standard, and the 5G NR is generated accordingly. The 5G NR is a global 5G standard of OFDM-based new air interface design, which is also a very important basis for the next generation of cellular mobile technology.

As mentioned above, the LTE system of the related art configures the same maximum number of times of SR transmission for all serving cells. Then, when the 5G NR system adopts the configuration mode of the maximum number of times of SR transmission in LTE system of the related art, the maximum number of times of SR transmission of the Ultra Reliable Low Latency Communications (URLLC) service is the same as the maximum number of times of SR transmission of the Enhanced Mobile Broadband (eMBB) service. However, URLLC service requires shorter delay, while the eMBB service is insensitive to the delay. When the maximum number of times of SR transmission is configured with a relative large value, it will inevitably introduce a relatively large delay to the URLLC service, and even lead to unnecessary overhead. When the maximum number of times of SR transmission is configured with a relative small value, it may lead to too many random access procedures. Both of the above situations require to be avoided when designing the system.

In addition, when all Physical Uplink Control Channel (PUCCH) resources are released due to that the number of times of SR transmission of one type of service reaches the maximum number of times of SR transmission, the SR of other types of services cannot be transmitted, which is a current problem to be solved.

SUMMARY

The present disclosure provides a method and a system for processing the SR to overcome the above problem or at least partially solve the above problem.

A first embodiment of the present disclosure provides a method for processing the SR, including:

configuring different SR parameters for different logical channels/logical channel groups based on the logical channels/logical channel groups; or configuring different SR parameters for different numerologies/Transmission Time Interval (TTI) types based on the numerologies/TTI types, for a User Equipment (UE) to detect whether SR count of the different logical channels/logical channel groups/numerologies/TTI types reaches maximum number of times of SR transmission;

wherein the SR parameter includes the maximum number of times of SR transmission and an SR prohibit timer.

A second embodiment of the present disclosure provides a method for processing the SR, including:

as for a current logical channel/logical channel group/numerology/TTI type, when detecting that SR count reaches a maximum number of times of SR transmission of the current logical channel/logical channel group/numerology/TTI type, releasing Physical Uplink Control Channel (PUCCH) resources on the numerology/TTI type corresponding to the current SR;

when Sounding Reference Signal (SRS) resources are configured on the numerology/TTI type corresponding to the current SR, releasing the SRS resources;

when downlink allocation and/or uplink grant resources are configured on the numerology/TTI type corresponding to the current SR, releasing the downlink allocation and/or uplink grant resources.

A third embodiment of the present disclosure provides a method for processing the SR, including:

as for a current logical channel/logical channel group/numerology/TTI type, when detecting that SR count reaches a maximum number of times of SR transmission of the current logical channel/logical channel group/numerology/TTI type, transmitting a current SR on SR resources on other numerologies/TTI types, to which the current SR is applicable;

wherein the SR resources on other numerologies/TTI types, to which the current SR is applicable, include SR resources on all numerologies/TTI types, to which services corresponding to the current SR are applicable, on other logical channels/logical channel groups.

A fourth embodiment of the present disclosure provides a base station, including: a module for configuring number of times of Scheduling Request (SR), wherein the module for configuring number of times of SR is configured to, configure different SR parameters for different logical channels/logical channel groups based on the logical channels/logical channel groups; or configure different SR parameters for different numerologies/Transmission Time Interval (TTI) types based on the numerologies/TTI types, for a User Equipment (UE) to detect whether SR count of the different logical channels/logical channel groups/numerologies/TTI types reaches maximum number of times of SR transmission;

wherein the SR parameter includes the maximum number of times of SR transmission and an SR prohibit timer.

A fifth embodiment of the present disclosure provides a User Equipment (UE), including a resource releasing module, wherein the resource releasing module is configured to, as for a current logical channel/logical channel group/numerology/TTI type, when detecting that SR count reaches a maximum number of times of SR transmission of the current logical channel/logical channel group/numerology/TTI type, release Physical Uplink Control Channel (PUCCH) resources on the numerology/TTI type corresponding to the current SR;

when Sounding Reference Signal (SRS) resources are configured on the numerology/TTI type corresponding to the current SR, release the SRS resources;

when downlink allocation and/or uplink grant resources are configured on the numerology/TTI type corresponding to the current SR, release the downlink allocation and/or uplink grant resources.

A sixth embodiment of the present disclosure provides a User Equipment (UE), including an SR resource transmission module, wherein the SR resource transmission module is configured to, as for a current logical channel/logical channel group/numerology/TTI type, when detecting that SR count reaches a maximum number of times of SR transmission of the current logical channel/logical channel group/numerology/TTI type, transmit a current SR on SR resources on other numerologies/TTI types, to which the current SR is applicable;

wherein the SR resources on other numerologies/TTI types, to which the current SR is applicable, include SR resources on all numerologies/TTI types, to which services corresponding to the current SR are applicable, on other logical channels/logical channel groups.

A seventh embodiment of the present disclosure provides a system for processing the SR, including at least one base station in the fourth embodiment of the present disclosure and at least one UE in the fifth embodiment of the present disclosure.

An eighth embodiment of the present disclosure provides a system for processing the SR, including at least one base station in the fourth embodiment of the present disclosure and at least one UE in the sixth embodiment of the present disclosure.

A ninth embodiment of the present disclosure provides a base station, including: a processor and a memory, wherein the memory is used to store programs and the processor calls the programs in the memory to execute steps in the method for processing the SR in the first embodiment.

A tenth embodiment of the present disclosure provides a User Equipment (UE), including a processor and a memory, wherein the memory is configured to store programs and the processor calls the programs in the storage to execute the steps in the method for processing the SR in the second embodiment.

An eleventh embodiment of the present disclosure provides a User Equipment (UE) for processing a Scheduling Request (SR), including: a processor and a memory, wherein the memory is configured to store programs and the processor calls the programs in the memory to execute the steps in the method for processing the SR in the third embodiment.

A twelfth embodiment of the present disclosure provides a computer readable storage medium, storing programs, wherein when the programs are executed by the processor, steps of the above method for processing the SR are implemented.

Embodiments of the present disclosure provide methods and systems for processing the SR. A problem that different services have different requirements for the maximum number of times of SR transmission in the 5G NR system is solved via configuring different maximum numbers of times of SR transmission for the different logical channels/logical channel groups by the base station. When the number of times of SR transmission of one logical channel/logical channel group reaches the maximum number, the UE only releases the resources on the corresponding numerology/TTI type, and does not release the resources of all serving cells and therefore does not affect the transmission of the SR of other services.

DETAILED DESCRIPTION

Figure 1:
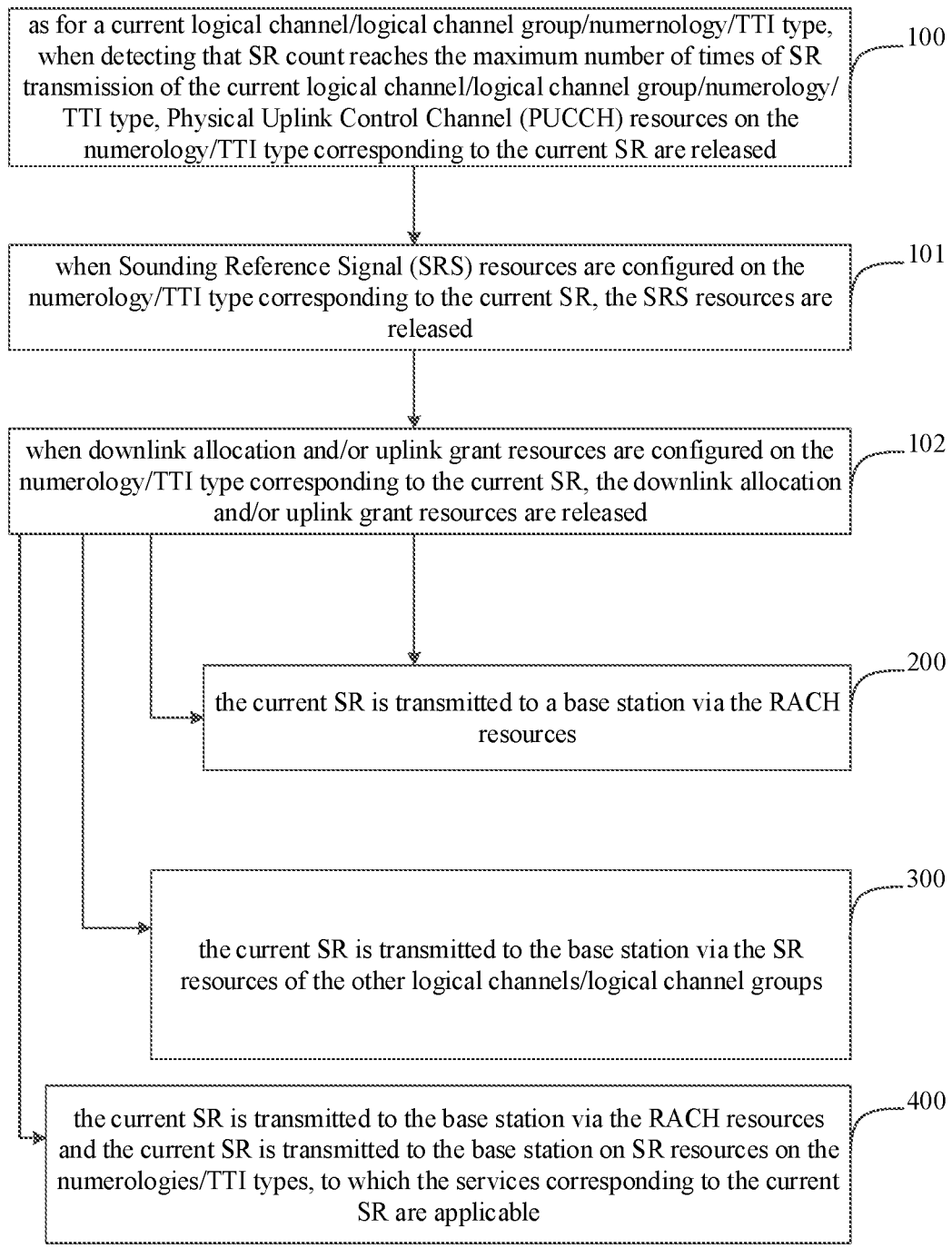
FIG. 1 is a flow chart illustrating a method for processing an SR at the UE side according to an embodiment of the present disclosure.

Further details of specific embodiments of the present disclosure are given below in conjunction with the drawings and embodiments. It should be understood that the specific embodiments described hereinafter are used only to explain the disclosure and are not used to limit the scope of the present disclosure.

The Scheduling Request (SR) is a mode that the UE requests resources, which are used to transmit new data, from the eNodeB. At present, the SR procedure of the LTE system mainly includes: a UE in an online state periodically allocating SR resources in UL resources. However, when the UE initiates UL data transmission, it is necessary for the UE to initiate the SR to the eNodeB first. After the eNodeB receives the SR, the UE, which has initiated the SR, is scheduled, so that the UE begins to transmit the UL data, which is not repeated here.

The SR belongs to information of the physical layer. The operation of transmitting the SR by the UE does not require Resource Block (RB) resources and the SR may be transmitted via a PUCCH control channel. After the eNodeB successfully decodes the SR signal of one UE, the eNodeB may allocate RB resources for the UE via DCI0 (which is a format of Downlink Control Information (DCI)). However, it cannot be guaranteed that the eNodeB may allocate the RB resources each time. Sometimes, although the UE transmits the SR signal, the eNodeB does not obtain the SR signal via decoding. In many cases, in order to obtain the UL RB resources, the UE requires to transmit the SR signal multiple times, i.e. re-transmit the SR signal multiple times.

However, the UE cannot re-transmit the SR signal without limit. At present, the LTE system monitors re-transmission of the SR signal using a timer, and sets the maximum number of times of re-transmission of the SR signal, i.e. maximum number of times of SR transmission. Also, the maximum number of times of SR transmission, i.e. dsr-TransMax configured by the eNodeB for the UE is the same for all serving cells.

The current 3GPP meetings have defined three major application scenarios for 5G, including eMBB, mMTC, and URLLC. The eMBB is used for large-flow mobile broadband services, such as 3D/ultra-hd video. The mMTC is used for large-scale Internet of things services. The URLLC is used for services such as unmanned drive and industrial automation that require low latency and high reliability connectivity. The three application scenarios have different requirements for UL resource scheduling of the UE. Therefore, setting the same maximum number of times of SR transmission, i.e. the dsr-transmax, cannot meet the application requirements in different scenarios well.

Therefore, a method for processing SR is put forward in the present disclosure. For different logical channels/logical channel groups that have been configured with SR, counting operations are separately performed and different maximum number of times of SR transmission counters are configured. In addition, a new processing method after reaching the maximum number of times of SR transmission is put forward to solve the problem in the related art that SR requests of other types of services cannot be transmitted due to releasing all PUCCH resources after reaching the maximum number of times of SR transmission.

It should be understood that in all technical schemes and embodiments of the present disclosure, the logical channel/logical channel group/numerology/Transmission Time Interval (TTI) type represents the logical channel, logical channel group or numerology/TTI type. When the logical channel/logical channel group/numerology/TTI type is selected as a logical channel in any technical scheme and embodiment, the subsequent logical channel/logical channel group/numerology/TTI type should also be selected as a logical channel. When the logical channel/logical channel group/numerology/TTI type is selected as a logical channel group in any technical scheme and embodiment, the subsequent logical channel/logical channel group/numerology/TTI type should also be selected as a logical channel group. In any technical scheme and embodiment, when the logical channel/logical channel group/numerology/TTI type is selected as the numerology/TTI type, the subsequent logical channel/logical channel group/numerology/TTI type should also be selected as the numerology/TTI type.

In a communication system, the MAC layer provides data transmission services on the logical channel. A set of types of the logical channels is defined for different types of data transmission services provided by the MAC layer. The logical channels may be divided into two categories: control channels and service channels. The control channel is used to transmit control plane information, while the service channel is used to transmit user plane information. In order to reduce uplink channel overhead, UL logical channels of the UE are generally divided into a logical channel group, i.e. some logical channels are grouped and classified.

The configuration of the maximum number of times of SR transmission in all technical schemes and embodiments of the present disclosure can be configured on the logical channel. When the logical channels are grouped into the logical channel group, the maximum number of times of SR transmission can also be configured in the logical channel group or configured on the numerology/TTI type.

The user equipment in the present disclosure may be various wired terminals or wireless terminals in various communication systems. The UE in this document refers to the user equipment in the present disclosure, and the two may be interchangeable in context semantics.

In the first embodiment, the present disclosure provides a method for processing the SR, including: configuring different SR parameters for different logical channels/logical channel groups based on the logical channels/logical channel groups; or configuring different SR parameters for different numerologies/TTI types based on the numerologies/TTI types, for UE to detect whether the SR count of different logical channels/logical channel groups/numerologies/TTI types reaches the maximum number of times of SR transmission.

The SR parameter includes the maximum number of times of SR transmission and an SR prohibit timer.

This embodiment describes the processing method of the eNodeB.

Based on all served UEs, the eNodeB may configure different maximum numbers of times of SR transmission and the SR prohibit timer for different logical channels/logical channel groups/numerologies/TTI types, respectively. The SR prohibit timer is used to monitor SR signals transmitted in the PUCCH. The UE cannot transmit SR signals when the SR prohibit timer is running. Once the timer expires, the UE requires to re-transmit the SR until reaching the maximum number of times of SR transmission. When the UE transmits the SR signal, the SR prohibit timer is used in conjunction with the maximum number of times of SR transmission.

The eNodeB configures different SR parameters for different logical channels/logical channel groups for each UE based on all served UEs. As shown in table 1, it illustrates an example of different maximum numbers of times of SR transmission configured for different logical channels/logical channel groups of the UE.

This embodiment may also configure different SR parameters for different numerologies/TTI types of different logical channels. As shown in table 2, it illustrates an example of different maximum numbers of times of SR transmission configured for different numerologies/TTI types of the UE. Of course, tables 1 and 2 are just examples, for reference only.

TABLE 1

| UE 1 | logical channel/logical channel group 1 | e-dsr-TransMax_1 |
| | logical channel/logical channel group 2 | e-dsr-TransMax_2 |
| | ... | |
| UE 2 | logical channel/logical channel group 1 | e-dsr-TransMax_1 |
| | logical channel/logical channel group 2 | e-dsr-TransMax_2 |
| | ... | |
| UE ... | ... | |

TABLE 2

| UE 1 | numerology/TTI type 1 | e-dsr-TransMax_1 |
| | numerology/TTI type 2 | e-dsr-TransMax_2 |
| | ... | |
| UE 2 | numerology/TTI type 1 | e-dsr-TransMax_1 |
| | numerology/TTI type 2 | e-dsr-TransMax_2 |
| | ... | |
| UE ... | ... | |

In this embodiment, the SR parameters of the logical channel/logical channel group/numerology/TTI type are generally configured simultaneously with SR resources of the logical channel/logical channel group/numerology/TTI type. Even after the SR resources are configured, the SR parameters of the logical channel/logical channel group/numerology/TTI type can still be reconfigured.

The numerology/TTI type is defined based on the 5G NR system.

The SR should at least distinguish the "numerology/TTI type" of the logical channel that triggered the SR (how this is done is FFS).

That is, the SR at least may be used to distinguish the "numerology/TTI type" corresponding to the logical channel.

In an example of the first embodiment, configuring different SR parameters for different logical channels/logical channel groups further includes: configuring the different or partially different SR parameters for the different logical channels of different UEs; and/or, as for UEs configured with logical channel groups, configuring the different or partially different SR parameters for the different logical channel groups.

In this example, an eNodeB may configure different SR parameters for the UEs according to the logical channels and may also configure different SR parameters for the UEs according to the logical channel groups. Specifically, at least three kinds of schemes are included.

1. For all UEs, for which the logical channel groups have been or have not been configured, different or partially different SR parameters are configured for the logical channels based on the logical channels.

2. For all UEs, for which the logical channel groups have not been configured, different or partially different SR parameters are configured for the different logical channels based on the logical channels. For all UE, for which the logical channel groups have been configured, different SR parameters are configured for the different logical channel groups based on the logical channel groups; or, different or partially different SR parameters are configured for different logical channels based on the logical channels.

3. For all the UEs, for which the logical channel groups have not been configured, different or partially different SR parameters are configured for different logical channels based on the logical channels. For all the UEs, for which the logical channel groups have been configured, different or partially different SR parameters are configured for the different logical channel groups based on the logical channel groups.

The above three schemes of configuring the SR parameters by the eNodeB are optional schemes based on the logical channels or logical channel groups.

In this embodiment and following various embodiments, the differences or partial differences include:

1. Different maximum numbers of times of SR transmission are respectively configured for different logical channels/logical channel groups/numerologies/TTI types of the different UEs. Among all the UEs, the maximum number of times of SR transmission of each logical channel/logical channel group is different.

2. Different maximum numbers of times of SR transmission are respectively configured for different logical channels/logical channel groups/numerologies/TTI types of one UE. The maximum number of times of SR transmission of each logical channel/logical channel group of one UE is different, and may be the same as or different from the maximum number of times of SR transmission of the logical channel/logical channel group of another UE.

3. The maximum number of times of SR transmission of the logical channel/logical channel group/numerology/TTI type of one UE may be the same or may be different.

In another example of the first embodiment, configuring the different SR parameters for the different logical channels/logical channel groups includes:

configuring the same SR parameter for logical channels of a same type and configuring different SR parameters for the logical channels of different types; and/or, as for UE configured with the logical channel groups, configuring a same SR parameter for logical channel groups of a same type and configuring different SR parameters for the logical channel groups of different types.

In this embodiment, for all UEs, for which the logical channel groups have not been configured, the eNodeB may configure a same SR parameter based on one type of logical channel and configure another same SR parameter based on another type of logical channel. Similarly, for all UEs, for which the logical channel groups have been configured, the eNodeB may configure a same SR parameter based on one type of logical channel group and configure another same SR parameter based on another type of logical channel group. On the other hand, as long as the logical channels belong to the same type, the eNodeB configures the same SR parameters for all the UEs. As long as the logical channel groups belong to the same type, the eNodeB configures the same SR parameter for all the UEs.

In this embodiment, no matter whether the UE is configured with the logical channel group, the eNodeB configures the SR parameters according to the logical channel.

One UE and the another UE in this embodiment are relative UEs, which are only described as different UEs, representing that the eNodeB configures different SR parameters for all different UEs. For the UEs, for which the logical channel groups have been configured, different SR parameters are configured according to the logical channel groups. For UEs, for which the logical channel groups have not been configured, different SR parameters are configured according to the logical channels.

Specifically, when the UEs are not configured with the logical channel groups, the eNodeB configures different SR parameters for the UEs according to each logical channel. When the UEs are configured with the logical channel groups, the eNodeB configures different SR parameters for the UEs according to each logical channel group for consideration of cost savings. Of course, under this condition, the eNodeB can still configure different SR parameters for the UEs according to each logical channel, according to specific service requirements and this embodiment does not make limitation on this.

In another example of the first embodiment, configuring the different SR parameters for the different numerologies/TTI types includes: configuring different or partially different SR parameters for the different numerologies/TTI types used by the UE for transmission.

In this embodiment, different SR parameters are configured based on the numerologies/TTI types. In general, different SR parameters are configured for different UEs with different numerologies/TTI types. However, same SR parameters, partially different SR parameters or partially same SR parameters also may be configured for the different UEs with different numerologies/TTI types. In addition, compared with the numerologies/TTI types, to which different service types are applicable, the numerologies/TTI types, to which the same service type is applicable, are more likely to be configured with the same SR parameter.

It can be seen that the eNodeB provided by the first embodiment can configure different SR parameters for the serving UEs in a variety of methods. The specific method selected may vary according to service requirements and performance requirements, and this embodiment does not make limitation.

As shown in FIG. 1, the second embodiment of the present disclosure provides a method for processing an SR, including:

100, as for a current logical channel/logical channel group/numerology/TTI type, when detecting that SR count reaches the maximum number of times of SR transmission of the current logical channel/logical channel group/numerology/TTI type, releasing Physical Uplink Control Channel (PUCCH) resources on the numerology/TTI type corresponding to the current SR;

101, when Sounding Reference Signal (SRS) resources are configured on the numerology/TTI type corresponding to the current SR, releasing the SRS resources;

102, when downlink allocation and/or uplink grant resources are configured on the numerology/TTI type corresponding to the current SR, releasing the downlink allocation and/or uplink grant resources.

This embodiment is the processing method at the UE. When the UE detects that the SR count reaches the maximum number of times of SR transmission of the current logical channel/logical channel group in one SR task, i.e. the current SR, the UE cannot continue to transmit the SR on the original resources and requires releasing the resources.

When detecting the SR count according to the current numerology/TTI type, the numerology/TTI type corresponding to the current SR in this embodiment is identical to the current numerology/TTI type, meaning that they belong to the same numerology/TTI type. This meaning is the same in the following embodiments and will not be repeated thereafter.

In this embodiment, the released resources may be the PUCCH resources, SRS resources and DL allocation and/or UL grant resources. However, this embodiment only releases the PUCCH resources, SRS resources and DL allocation and/or UL grant resources of the numerology/TTI type corresponding to the current SR task, and does not release PUCCH resources, SRS resources and DL allocation and/or UL grant resources of all serving cells.

In this embodiment, the releasing of the resources includes three operations, i.e. blocks 100, 101 and 102, but does not limit the execution order among them. As long as the three kinds of resources are released, the three kinds of resources may be released in any order. Only for the sake of literal description and clarity, it presents a certain position or order, but it does not limit the real execution order.

The method described in this embodiment only releases the resources of the numerology/TTI type corresponding to the current SR, and does not release the resources of all serving cells and therefore does not affect the transmission of the SR of other services.

Referring to FIG. 1, in one example of the second embodiment, the method for processing the SR further includes:

200, when detecting that the SR count reaches the maximum number of times of SR transmission of the current logical channel/logical channel group/numerology/TTI type, initiating a Random Access Channel (RACH) procedure on RACH resources of the numerology/TTI type corresponding to the current SR and transmitting the current SR to a base station via the RACH procedure.

In this embodiment, the UE cannot transmit the current SR on the original resources, and this embodiment proposes a method, in which the current SR is transmitted to the base station through the RACH resources of the numerology/TTI type corresponding to the current SR.

The RACH (Random Access Channel) resource is a Random Access Channel and is an UL transmission Channel. The RACH is received in the whole cell. It is usually used for PAGING reply and MS originating call/login access etc. In this embodiment, when the number of times of SR transmission reaches the maximum number, a RACH procedure is initiated through the RACH resources and the RACH procedure is used to transmit the current SR.

In this embodiment, when the number of times of SR transmission of the current logical channel/logical channel group reaches the maximum number, resources corresponding to the numerology/TTI type are released, without affecting SR transmission of other services. At the same time, the current SR is further transmitted through the RACH resources and the resource utilization can be effectively improved.

Another example of the second embodiment further includes: when detecting that the SR count reaches the maximum number of times of SR transmission of the current logical channel/logical channel group/numerology/TTI type and there is no RACH resource on the numerology/TTI type corresponding to the current SR, transmitting the current SR to the base station via first random resources or second random resources.

The first random resources include other RACH resources which are randomly selected besides the RACH resources of the numerology/TTI type corresponding to the current SR. The second random resources include other RACH resources, which are randomly selected and accepted by the current logical channel/logical channel group, besides the RACH resources of the numerology/TTI type corresponding to the current SR.

In the above embodiment, when the UE transmits the current SR through the RACH resources on the corresponding numerology/TTI type, it is necessary to detect the RACH resources on the corresponding numerology/TTI type or obtain the RACH resources on the corresponding numerology/TTI type first. When no RACH resource is available for the corresponding numerology/TTI type, this embodiment provides a solution method including two alternative schemes, one of which may be chosen.

The first scheme is to transmit the current SR through first random resources. Since the RACH resources are no longer available on the numerology/TTI type corresponding to the current SR, the first random resources are other RACH resources, which are randomly selected. That is, RACH resources currently available on the UE can be selected. This scheme can make the use of resources in the UE system more balanced, and the selection range is larger, so the probability of success of selection is higher.

The second scheme is to transmit the current SR through the second random resources. Since RACH resources are no longer available on the numerology/TTI type corresponding to the current SR, the second random resources are other RACH resources that are randomly selected and acceptable to the current logical channel/logical channel group. Compared with the first scheme, the selection range of the RACH resource is small, so the probability of success of selection is relatively small. However, because they are acceptable RACH resources for the current logical channel/logical channel group, it has a faster response time than the first scheme and it is more beneficial to the specific application once selected.

In another example of the second embodiment, transmitting the current SR to the eNodeB via the first random resources or the second random resources includes:

when there is no RACH resource on the numerology/TTI type corresponding to the current SR, obtaining the second random resources;

when the second random resources are successfully obtained, transmitting the current SR to the base station via the second random resources;

when the second random resources are failed to be obtained, obtaining the first random resources and transmitting the current SR to the base station via the first random resources.

In a preferred embodiment, when the number of times of SR transmission of the current logical channel/logical channel group reaches the maximum number and there is no RACH resource on the numerology/TTI type corresponding to the current SR, the signal transmission speed should be considered first and the current SR should be transmitted to the base station first through the second random resources. After the second random resources are failed to be obtained, the current SR is transmitted to the base station through the first random resources.

In the above embodiment, after the number of times of SR transmission of the current logical channel/logical channel group reaches the maximum number, the UE initiates the RACH procedure through the RACH resources to transmit the current SR. The following embodiment introduces an another method, in which the UE transmits the current SR through the SR resources of other logical channels/logical channel groups after the number of times of SR transmission of the current logical channel/logical channel group reaches the maximum number. One UE transmits the current SR either through the RACH resources or through the SR resources of other logical channels/logical channel groups, either way.

Referring to FIG. 1, in another example of the second embodiment, the method further includes:

300, when detecting that the SR count reaches the maximum number of times of SR transmission of the current logical channel/logical channel group/numerology/TTI type, selecting a specific logical channel/logical channel group with a configured maximum number of times of SR transmission being less than the maximum number of times of SR transmission of the current logical channel/logical channel group/numerology/TTI type, from other logical channels/logical channel groups configured with SR resources;

transmitting the current SR to the base station via the SR resources of the specific logical channel/logical channel group;

wherein the SR resources of the specific logical channel/logical channel group include SR resources on all numerologies/TTI types, to which services corresponding to the current SR are applicable.

In this embodiment, the UE cannot transmit the current SR on the original resources, and this embodiment proposes a method. In this method, in other logical channels/logical channel groups, for which the SR resources have been configured, an SR resource of a specific logical channel/logical channel group is selected to transmit the current SR to the base station.

The service corresponding to the current SR in this embodiment has multiple applicable numerologies/TTI types, and therefore the SR can be transmitted through the SR resources of all the applicable numerologies/TTI types.

Assuming that the maximum number of times of SR transmission of the current logical channel/logical channel group is e-dsr-TransMax_2, the maximum number of times of SR transmission of the specific logical channel/logical channel group is e-dsr-TransMax_k, then e-dsr-TransMax_2>e-dsr-TransMax_k.

Specifically speaking, when the maximum number of times of SR transmission is configured according to the logical channel, the maximum number of times of SR transmission of the current logical channel and the maximum number of times of SR transmission of the specific logical channel are compared according to the above method. When the conditions are met, the current SR is transmitted on the SR resources of the specific logical channel.

When the maximum number of times of SR transmission is configured according to the logical channel group, the maximum number of times of SR transmission of the current logical channel and the maximum number of times of SR transmission of the specific logical channel are compared according to the above method. When the conditions are met, the current SR is transmitted on the SR resources of one specific logical channel in this specific logical channel group.

In this embodiment, when the number of times of SR transmission of the current logical channel/logical channel group reaches the maximum number, resources on the corresponding numerology/TTI type are released, without affecting SR transmission of other services. At the same time, the current SR is transmitted through the SR resources of other logical channels/logical channel groups, which can effectively improve the utilization of the resources.

In another example of the second embodiment, the specific logical channel/logical channel group includes a first logical channel/logical channel group or a second logical channel/logical channel group.

The first logical channel/logical channel group includes a logical channel/logical channel group, which is randomly selected from the other logical channels/logical channel groups.

The second logical channel/logical channel group includes a logical channel/logical channel group, which is selected from the other logical channels/logical channel groups and configured with the maximal maximum number of times of SR transmission.

Based on the above embodiment, this embodiment proposes two alternatives for the specific logical channel/logical channel group, including the first logical channel/logical channel group or the second logical channel/logical channel group, either of which may be chosen.

On the premise of satisfying the e-dsr-TransMax_2>e-dsr-TransMax_k, the specific logical channel/logical channel group is a logical channel/logical channel group, which is randomly selected from other logical channels/logical channel groups, or a specific logical channel/logical channel group with the maximal maximum number of times of SR transmission in other logical channels/logical channel group.

Therefore, when the first logical channel/logical channel group is adopted, as long as the maximum number of times of SR transmission of a randomly-selected logical channel/logical channel group is less than the maximum number of times of SR transmission of the current logical channel/logical channel group, the current SR is transmitted via the SR resources of the selected logical channel/logical channel group.

When the second logical channel/logical channel group is adopted, the logical channel/logical channel group with the maximal maximum number of times of SR transmission is selected from the other logical channels/logical channel groups. When the maximum number of times of SR transmission of the selected logical channel/logical channel group is less than the maximum number of times of SR transmission of the current logical channel/logical channel group, the current SR is transmitted via the SR resources of the selected logical channel/logical channel group.

In another example of the second embodiment, when detecting that the SR count reaches the maximum number of times of SR transmission of the current logical channel/logical channel group, SR resources of the second logical channel/logical channel group are selected to transmit the current SR to the base station;

when selection of the second logical channel/logical channel group is failed, SR resources of the first logical channel/logical channel group are selected to transmit the current SR to the base station.

This embodiment provides a preferred scheme. When the number of times of SR transmission of the current logical channel/logical channel group reaches the maximum number, it is preferred to transmit the current SR to the base station via the SR resources on the second logical channel/logical channel group. In the case of failure to select the second logical channel/logical channel group, the SR resources of the first logical channel/logical channel group are selected to transmit the current SR to the base station.

Since the maximum number of times of SR transmission of the second logical channel/logical channel group is the largest among those of other logical channels/logical channel groups, the second logical channel/logical channel group can more effectively ensure the final successful transmission of the SR.

In another example of the second embodiment, transmitting the current SR to the base station via the SR resources of the specific logical channel/logical channel group includes:

transmitting the current SR to the base station via SR resources on one numerology/TTI type selected from SR resources on all numerologies/TTI types, to which services corresponding to the current SR are applicable;

when the number of times of SR retransmission reaches the maximum number of times of SR transmission of the one numerology/TTI type, transmitting the current SR to the base station via SR resources on another numerology/TTI type selected from SR resources on all numerologies/TTI types, to which the services corresponding to the current SR are applicable, until all numerologies/TTI types, to which services corresponding to the current SR are applicable, reach the maximum numbers of times of SR transmission.

In this embodiment, when there are multiple available numerologies/TTI types for the services corresponding to the current SR and the UE does not obtain the UL resources allocated by the eNodeB, the UE may try to transmit the SR through the SR resources of all available numerologies/TTI types, until all available numerologies/TTI types reach the maximum numbers of times of SR transmission, thereby ensuring that the SR is transmitted to the eNodeB. Of course, once the UE obtains the UL resources allocated by eNodeB, the procedure stops. The UE stops transmitting the SR through numerology/TTI type at any time when the UE obtains the UL resources allocated by the eNodeB, without necessarily exhausting the SR resources of all numerologies/TTI types.

In another example of the second embodiment, when all numerologies/TTI types, to which the services corresponding to the current SR are applicable, have reached the maximum number of times of SR transmission, other RACH resources are randomly selected to transmit the SR.

This embodiment is based on the above embodiment, when the UE transmits the SR on the SR resources of all numerologies/TTI types, to which all services corresponding to the current SR are applicable, and the maximum number of times of SR transmission are reached, i.e., SR resources of all the numerologies/TTI types have been exhausted, the UE still fails to obtain the UL resources allocated by the eNodeB, the UE continues to transmit the SR via the random resources, i.e., randomly chooses other RACH resources to transmit the SR.

In another example of the second embodiment, when detecting that the SR count reaches the maximum number of times of SR transmission of the current logical channel/logical channel group/numerology/TTI type, the current SR is transmitted to the base station via SR resources on one numerology/TTI type, to which services corresponding to the current SR are applicable and which is selected from other logical channels/logical channel groups;

when all numerologies/TTI types, to which the services corresponding to the current SR are applicable, reach the maximum numbers of times of SR transmission, other RACH resources are randomly selected to transmit the SR.

In this embodiment, it remains that when the maximum number of times of SR transmission of the logical channel/group/numerology/TTI type corresponding to the current SR is reached, the current SR is transmitted to the base station via other SR resources on the numerology/TTI type, to which the service corresponding to the current SR. Until all the numerologies/TTI types reach the maximum numbers of times of SR transmission, other RACH resources are randomly selected to transmit the SR. Different from the above embodiment, this embodiment requires not to compare the maximum number of times of SR transmission of the logical channel/logical channel group of the applicable numerology/TTI type or the current numerology/TTI type and the maximum number of times of SR transmission of the current logical channel/logical channel group/numerology/TTI type.

Referring to FIG. 1, in another example of the second embodiment, the method for processing the SR includes:

400, selecting SR resources on a numerology/TTI type, to which services corresponding to the current SR are applicable, from other logical channels/logical channel groups to transmit the current SR to the base station.

The basic embodiment of the present embodiment includes: when detecting that the SR count reaches the maximum number of times of SR transmission of the current logical channel/logical channel group/numerology/TTI type, transmitting the current SR to the base station via a Random Access Channel (RACH) procedure on RACH resources of the numerology/TTI type corresponding to the current SR.

On this basis, further, the current SR is transmitted to the base station via the SR resources on the numerology/TTI type, to which the service corresponding to the current SR is applicable.

Therefore, in this embodiment, the UE can transmit the SR through the SR resources while transmitting the SR through the RACH resources. Two different schemes for transmitting the SR are implemented simultaneously in one UE, and two different schemes for transmitting the SR are executed simultaneously.

In another example of the second embodiment, after detecting that the SR count reaches the maximum number of times of SR transmission of the current logical channel/logical channel group/numerology/TTI type, the method further includes:

obtaining the maximum number of times of SR transmission configured by the base station for the current logical channel/logical channel group/numerology/TTI type;

determining whether the SR count of the current logical channel/logical channel group/numerology/TTI type equals the maximum number of times of SR transmission configured for the current logical channel/logical channel group/numerology/TTI type;

when the SR count of the current logical channel/logical channel group/numerology/TTI type equals the maximum number of times of SR transmission configured for the current logical channel/logical channel group/numerology/TTI type, detecting that the SR count reaches the maximum number of times of SR transmission of the current logical channel/logical channel group/numerology/TTI type.

This embodiment describes the method for the UE to detect the SR count. Since the eNodeB configures the maximum number of times of SR transmission based on a single logical channel/logical channel group or a single numerology/TTI type, the UE detects the SR count based on the single logical channel/logical channel group or the single numerology/TTI type.

First, the UE requires obtaining the maximum number of times of SR transmission e-dsr-TransMax_2 configured by the eNodeB for the current logical channel/logical channel group or configured for the current numerology/TTI type. The SR count is carried out each time the current logical channel/logical channel group/numerology/TTI type retransmits the SR and adds 1 each time. Then, the SR count is compared to the e-dsr-TransMax_2. When the SR count equals the e-dsr-TransMax_2, the number of times of SR transmission of the current logical channel/logical channel group/numerology/TTI type reaches the maximum number.

In a third embodiment, the present disclosure provides a method for processing an SR, including:

as for a current logical channel/logical channel group/numerology/TTI type, when detecting that the SR count reaches maximum number of times of SR transmission of the current logical channel/logical channel group/numerology/TTI type, transmitting a current SR on SR resources on other numerologies/TTI types, to which the current SR is applicable;

wherein the SR resources on other numerologies/TTI types, to which the current SR is applicable, include SR resources on all numerologies/TTI types, to which services corresponding to the current SR are applicable, on other logical channels/logical channel groups.

In this embodiment, when the SR count reaches the maximum number of times of SR transmission of the current logical channel/logical channel group/numerology/TTI type, no PUCCH resource is released, and the SR continues to be transmitted on the SR resources of other numerology and RACH is not performed. When there are multiple other numerologies/TTI types, to which the services corresponding to the current SR are applicable, then the SR can be transmitted on the SR resources of all numerologies/TTI types in turn before the UE obtains the UL resources allocated by the eNodeB.

In an example of the third embodiment, when all numerologies/TTI types, to which the services corresponding to the current SR are applicable, reach the maximum number of times of SR transmission, other RACH resources are randomly selected to transmit the SR.

In this embodiment, on the basis of the above embodiment, when the UE tries to transmit the SR on all numerologies/TTI types, to which the services corresponding to the current SR are applicable, and when the UE does not obtain the UL resources allocated by eNodeB after the transmission numbers reach the maximum numbers of times of SR transmission, the UE randomly selects other RACH resources to transmit the SR.

In a fourth embodiment, the present disclosure provides a base station, including: a module for configuring number of times of Scheduling Request (SR). The module for configuring number of times of SR is configured to configure different SR parameters for different logical channels/logical channel groups based on the logical channels/logical channel groups; or configure different SR parameters for different numerologies/Transmission Time Interval (TTI) types based on the numerologies/TTI types, for a User Equipment (UE) to detect whether SR count of the different logical channels/logical channel groups/numerologies/TTI types reach maximum number of times of SR transmission;

wherein the SR parameter includes the maximum number of times of SR transmission and an SR prohibit timer.

The embodiment is a method for processing the SR at the base station side and the corresponding executing entity is the base station eNodeB. For specific description, please refer to the first embodiment of the corresponding method, which will not be described here.

In an example of the fourth embodiment, configuring the different SR parameters for the different logical channels/logical channel groups includes:

configuring the different or partially different SR parameters for the different logical channels of different UEs; and/or as for UEs, for which the logical channel groups have been configured, configuring the different or partially different SR parameters for the different logical channel groups.

In another example of the fourth embodiment, configuring the different SR parameters for the different logical channels/logical channel groups includes:

configuring a same SR parameter for logical channels of a same type and configuring different SR parameters for the logical channels of different types; and/or as for UEs, for which the logical channel groups have been configured, configuring a same SR parameter for logical channel groups of a same type and configuring different SR parameters for the logical channel groups of different types.

In another example of the fourth embodiment, configuring the different SR parameters for the different numerologies/TTI types includes:

configuring different or partially different SR parameters for the different numerologies/TTI types used by the UE for transmission.

As for specific description of configuring different SR parameters for different logical channels/logical channel groups as described in the above embodiments, please refer to specific description of the corresponding first method embodiment, which will not be repeated here.

In a fifth embodiment, the present disclosure provides a User Equipment (UE), including a resource releasing module. The resource releasing module is configured to:

as for a current logical channel/logical channel group/numerology/TTI type, when detecting that SR count reaches the maximum number of times of SR transmission of the current logical channel/logical channel group/numerology/TTI type, release Physical Uplink Control Channel (PUCCH) resources on the numerology/TTI type corresponding to the current SR;

when Sounding Reference Signal (SRS) resources are configured on the numerology/TTI type corresponding to the current SR, release the SRS resources;

when downlink allocation and/or uplink grant resources are configured on the numerology/TTI type corresponding to the current SR, release the downlink allocation and/or uplink grant resources.

The embodiment is a method for processing the SR at the UE side and the corresponding executing entity is the UE. For specific description, please refer to the corresponding second method embodiment, which will not be described here. Description of all embodiments below the fourth embodiment is the same as that of the corresponding second method embodiment, which will not be described here.

In another example of the fifth embodiment, the UE further includes a random resource transmission module, configured to when detecting that the SR count reaches the maximum number of times of SR transmission of the current logical channel/logical channel group/numerology/TTI type, initiate a Random Access Channel (RACH) procedure on RACH resources of the numerology/TTI type corresponding to the current SR and transmit the current SR to the base station via the RACH procedure.

In another example of the fifth embodiment, the random resource transmission module is further configured to when detecting that the SR count reaches the maximum number of times of SR transmission of the current logical channel/logical channel group/numerology/TTI type and there is no RACH resource on the numerology/TTI type corresponding to the current SR, transmit the current SR to the base station via first random resources or second random resources.

The first random resources include other randomly-selected RACH resources besides the RACH resources of the numerology/TTI type corresponding to the current SR.

The second random resources include other RACH resources, which are randomly selected and accepted by the current logical channel/logical channel group, besides the RACH resources of the numerology/TTI type corresponding to the current SR.

In another example of the fifth embodiment, the random resource transmission module is further configured to when there is no RACH resource on the numerology/TTI type corresponding to the current SR, obtain the second random resources;

when the second random resources are successfully obtained, transmit the current SR to the base station via the second random resources; or when the second random resources are failed to be obtained, obtain the first random resources and transmit the current SR to the base station via the first random resources.

In another example of the fifth embodiment, the UE further includes an SR resource transmission module, configured to when detecting that the SR count reaches the maximum number of times of SR transmission of the current logical channel/logical channel group/numerology/TTI type, select a specific logical channel/logical channel group with a configured maximum number of times of SR transmission being less than the maximum number of times of SR transmission of the current logical channel/logical channel group/numerology/TTI type, from other logical channels/logical channel groups configured with SR resources;

transmit the current SR to the base station via the SR resources of the specific logical channel/logical channel group;

wherein the SR resources of the specific logical channel/logical channel group include SR resources on all numerologies/TTI types, to which services corresponding to the current SR are applicable.

In another example of the fifth embodiment, the specific logical channel/logical channel group includes a first logical channel/logical channel group or a second logical channel/logical channel group;

the first logical channel/logical channel group includes a logical channel/logical channel group, which is randomly selected from the other logical channels/logical channel groups;

the second logical channel/logical channel group includes a logical channel/logical channel group, which is selected from the other logical channels/logical channel groups and configured with the maximal maximum number of times of SR transmission.

In another example of the fifth embodiment, the SR resource transmission module is further configured to select SR resources of the second logical channel/logical channel group to transmit the current SR to the base station when the SR count reaches the maximum number of times of SR transmission of the current logical channel/logical channel group;

select SR resources of the first logical channel/logical channel group to transmit the current SR to the base station when the selection of the second logical channel/logical channel group is failed.

In another example of the fifth embodiment, the SR resource transmission module is further configured to transmit the current SR to the base station via SR resources on one numerology/TTI type selected from SR resources on all numerologies/TTI types, to which services corresponding to the current SR are applicable;

when the number of times of SR retransmission reaches the maximum number of times of SR transmission of the one numerology/TTI type, transmit the current SR to the base station via SR resources on another numerology/TTI type selected from SR resources on all numerologies/TTI types, to which the services corresponding to the current SR are applicable, until all numerologies/TTI types, to which services corresponding to the current SR are applicable, reach the maximum number of times of SR transmission.

In another example of the fifth embodiment, the SR resource transmission module is further configured to when all the numerologies/TTI types, to which the services corresponding to the current SR are applicable, reach the maximum number of times of SR transmission, randomly select other RACH resources to transmit the SR.

In another example of the fifth embodiment, the UE further includes: an SR resource loop transmission module. The SR resource loop transmission module is configured to, when detecting that the SR count reaches the maximum number of times of SR transmission of the current logical channel/logical channel group/numerology/TTI type, transmit the current SR to the base station via SR resources on one numerology/TTI type, to which services corresponding to the current SR are applicable and which is selected from other logical channels/logical channel groups;

when all numerologies/TTI types, to which the services corresponding to the current SR are applicable, reach the maximum number of times of SR transmission, randomly select other RACH resources to transmit the SR.

In another example of the fifth embodiment, the random resource transmission module is further configured to select SR resources on a numerology/TTI type, to which services corresponding to the current SR are applicable, from other logical channels/logical channel groups to transmit the current SR to the base station.

In another example of the fifth embodiment, the resource releasing module further includes a detection unit and the detection unit is configured to, obtain the maximum number of times of SR transmission configured by the base station for the current logical channel/logical channel group or current numerology/TTI type;

determine whether the SR count of the current logical channel/logical channel group/numerology/TTI type equals the maximum number of times of SR transmission configured for the current logical channel/logical channel group/ numerology/TTI type;

when the SR count of the current logical channel/logical channel group/numerology/TTI type equals the maximum number of times of SR transmission configured for the current logical channel/logical channel group/numerology/ TTI type, detect that the SR count reaches the maximum number of times of SR transmission of the current logical channel/logical channel group/numerology/TTI type.

In a sixth embodiment, the present disclosure provides a UE for scheduling an SR, including an SR resource transmission module. The SR resource transmission module is configured to, as for a current logical channel/logical channel group/ numerology/TTI type, when detecting that the SR count reaches the maximum number of times of SR transmission of the current logical channel/logical channel group/numerology/TTI type, transmit a current SR on SR resources on other numerologies/TTI types, to which the current SR is applicable.

The SR resources on other numerologies/TTI types, to which the current SR is applicable, include SR resources on all numerologies/TTI types, to which services corresponding to the current SR are applicable, on other logical channels/ logical channel groups.

In an example of the sixth embodiment, a random resource transmission module is further included. The random resource transmission module is configured to, when all numerologies/TTI types, to which the services corresponding to the current SR are applicable, reach the maximum number of times of SR transmission, randomly select other RACH resources to transmit the SR.

In a seventh embodiment, the present disclosure provides a system for processing an SR, including at least one base station and at least one UE.

In this embodiment, the base station is the base station in the fourth embodiment or any example in the fourth embodiment, and the UE is the UE in the fifth embodiment, and further the UE may be the UE of any example in the fifth embodiment.

In general, in the system of this embodiment, the base station eNodeB provides an SR-number configuration function, which is used to configure different maximum numbers of times of SR transmission for different logical channels/ logical channel groups based on the logical channels/logical channel groups.

Figure 2:
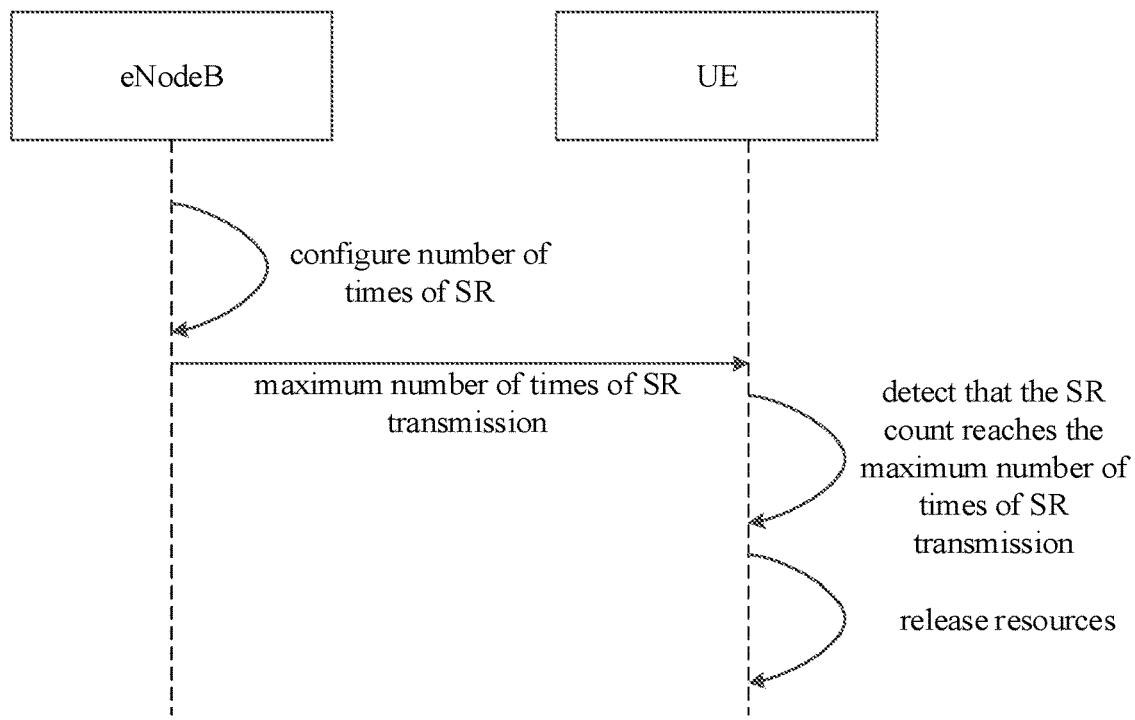
FIG. 2 is a diagram illustrating first interactions of a system for processing an SR according to an embodiment of the present disclosure.

In the system of the present disclosure, when the SR count reaches the maximum number of times of SR transmission of the current logical channel/logical channel group, the UE provides the basic resource release function. When the UE detects that the SR count reaches the maximum number of times of SR transmission of the current logical channel/ logical channel group in one SR task, i.e. the current SR, the UE releases the PUCCH resources, SRS resources and DL allocation and/or UL grant resources on the numerology/TTI type corresponding to the current SR task. The interaction diagram of the system described in the above basic embodiments is shown in FIG. 2.

Further, on the basis of the basic embodiment, the UE in the system in this embodiment also provides a function for transmitting the current SR through the RACH random resources in a manner including: transmitting the current SR to the base station through the RACH resources of the numerology/TTI type corresponding to the current SR, or through other RACH resources besides the RACH resources of the numerology/TTI type corresponding to the current SR. Specifically, the other RACH resources include other RACH resources that are randomly selected and other RACH resources that are randomly selected and acceptable to the current logical channel/logical channel group. Of course, preferred schemes are also included. For details, please refer to the corresponding description of the fourth embodiment, which will not be repeated here.

Figure 3:
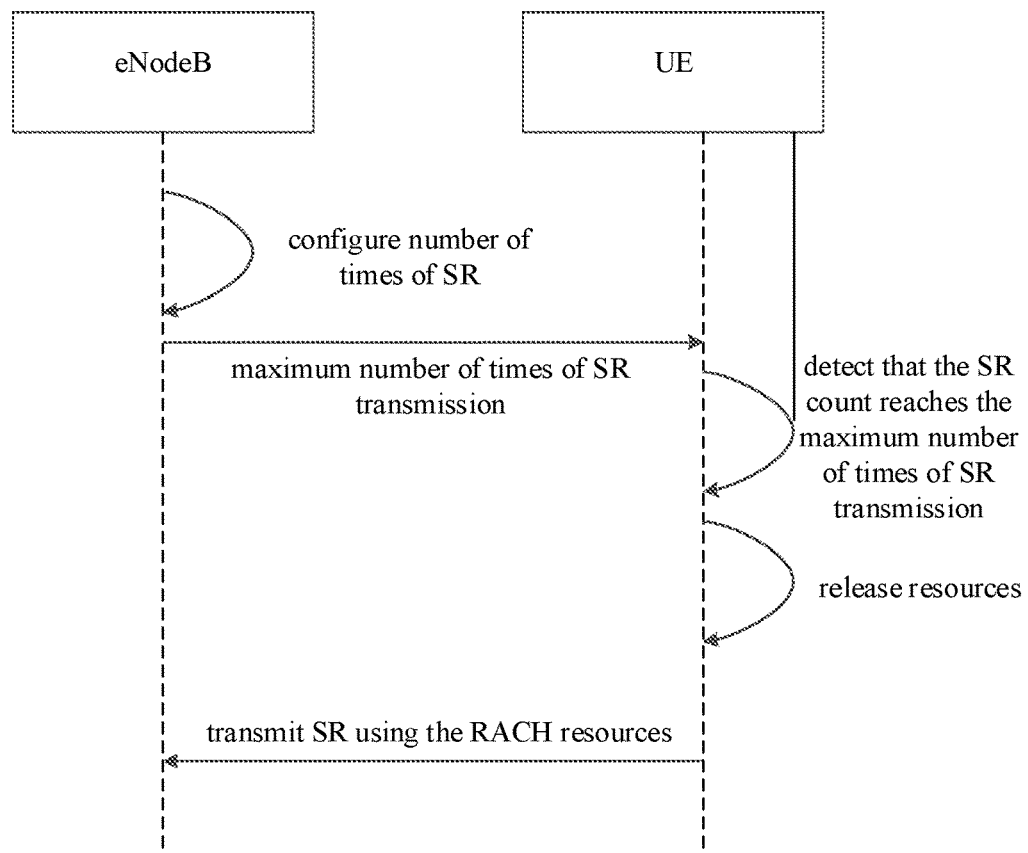
FIG. 3 is a diagram illustrating second interactions of a system for processing an SR according to an embodiment of the present disclosure.

The interaction diagram of the system in this embodiment is shown in FIG. 3. The eNodeB configures different maximum numbers of times of SR transmission for different logical channels/logical channel groups for each UE. The UE obtains the configuration of the maximum number of times of SR transmission of the current logical channel/ logical channel group. In each SR task, the SR count detection is carried out first. Once the SR count reaches the configuration of the maximum number of times of SR transmission, the resources are released, as described above. The UE then transmits the current SR through the RACH resources of the numerology/TTI type corresponding to the current SR or through other RACH resources.

This system also provides another scheme. Further, on the basis of the basic embodiment, the UE in the system also provides a function of transmitting the current SR via the SR resources of the other logical channels/logical channel groups. The function specifically includes: selecting a specific logical channel/logical channel group with a configured maximum number of times of SR transmission being less than the maximum number of times of SR transmission of the current logical channel/logical channel group; and transmitting the current SR to the base station via the SR resources of the specific logical channel/logical channel group. The specific logical channel/logical channel group includes: the first logical channel/logical channel group or the second logical channel/logical channel group. A preferred scheme is also included. For details, please refer to the corresponding description of the fourth embodiment, which will not be repeated here.

Figure 4:
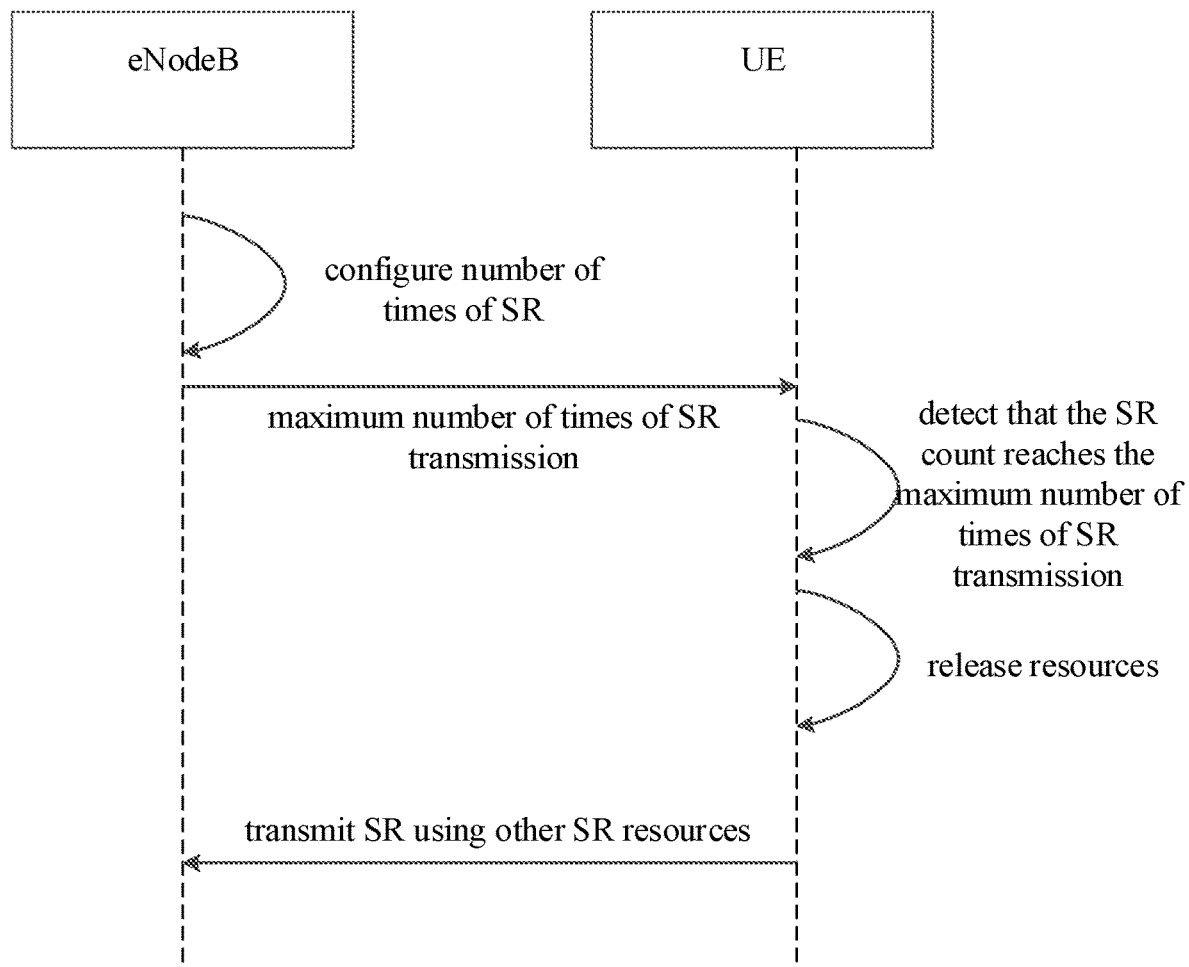
FIG. 4 is a diagram illustrating third interactions of a system for processing an SR according to an embodiment of the present disclosure.

The interaction diagram of the system in this further embodiment is shown in FIG. 4. The eNodeB configures different maximum numbers of times of SR transmission for different logical channels/logical channel groups for each UE. The UE obtains the configuration of the maximum number of times of SR transmission for the current logical channel/logical channel group. In each SR task, the SR count is detected first. Once the SR count reaches the configuration of the maximum number of times of SR transmission, the resources are released, as described above. The UE then transmits the current SR through SR resources of the other logical channels/logical channel groups.

In another example of the seventh embodiment, the system for processing the SR may also include at least one base station, at least one first UE and at least one second UE.

In this embodiment, the base station is the base station in the fourth embodiment or the base station in any embodiment of the fourth embodiment. The first UE is the UE that transmits the current SR via the RACH random resources in the fifth embodiment. The second UE is the UE that transmits the current SR via the SR resources of the logical channel/logical channel group in the fifth embodiment.

It is indicated here that in the system described in this embodiment, the first UE and the second UE adopt different schemes when the numbers of times of SR transmission reach the maximum numbers and the SR is retransmitted, and the two schemes can be applied simultaneously in one same system. Specifically, refer the fourth embodiment or the corresponding second embodiment of the method for the specific implementation schemes of the first UE and the second UE.

Figure 5:
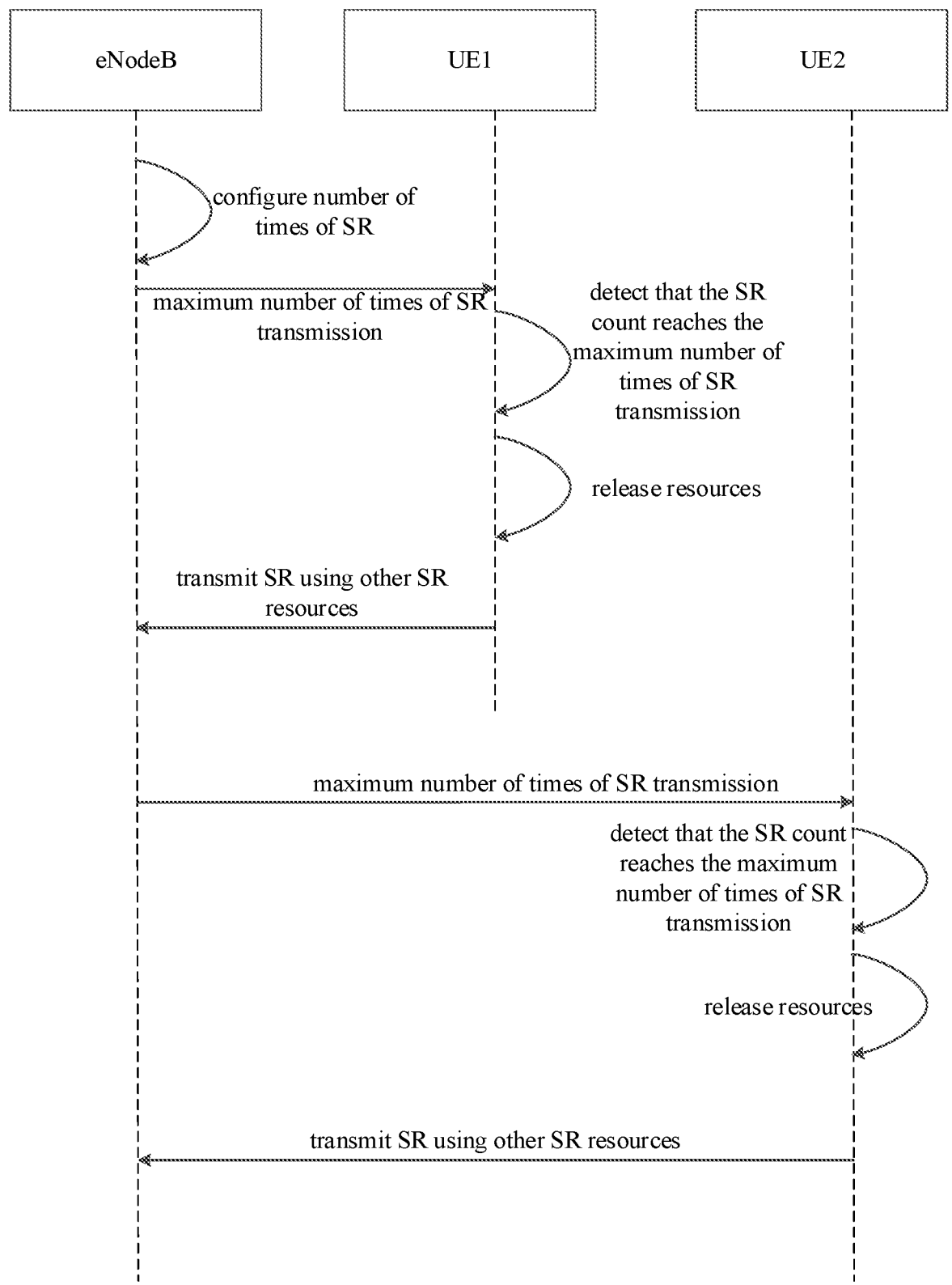
FIG. 5 is a diagram illustrating fourth interactions of a system for processing an SR according to an embodiment of the present disclosure.

The interaction diagram of the system in this embodiment is shown in FIG. 5. The eNodeB configures different maximum numbers of times of SR transmission for different logical channels/logical channel groups for each UE. The first UE and second UE are the UE1 and UE2 in FIG. 5 and need to obtain the configuration of the maximum number of times of SR transmission of the current logical channel/logical channel group, perform the SR count detection in each SR task first, and release resources once the SR count reaches the configuration of the maximum number of times of SR transmission, as mentioned above.

The different processing for first UE and second UE includes:

transmitting the current SR by the UE1 via the RACH resources of the numerology/TTI type corresponding to the current SR or via other RACH resources; and transmitting the current SR by the UE2 via the SR resources of the other logical channels/logical channel groups.

In the seventh embodiment, since in one example of the second embodiment, the UE may transmit the SR through the SR resources and meanwhile transmit the SR through the RACH resources, two different schemes for transmitting the SR are simultaneously implemented in one UE and two different schemes for transmitting the SR are simultaneously executed. Therefore, in this embodiment, one UE in the system for processing the SR may simultaneously transmit the SR through the above two schemes.

In the eighth embodiment, the present disclosure provides a system for processing an SR, including at least one base station in the fourth embodiment and at least one UE in the sixth embodiment.

When the SR count reaches the maximum number of times of SR transmission of the current logical channel/logical channel group/numerology/TTI type, the UE in this embodiment does not release any PUCCH resource, and continues to transmit the SR on the SR resources of another numerology and does not perform the RACH. Further, when the UE tries to transmit the SR on all numerologies/TTI types, to which the service corresponding to the current SR is applicable and the maximum number of times of SR transmission are reached, other RACH resources are randomly chosen to transmit the SR. For a more detailed description of the processing of the UE, refer to the sixth embodiment in the present disclosure.

Figure 6:
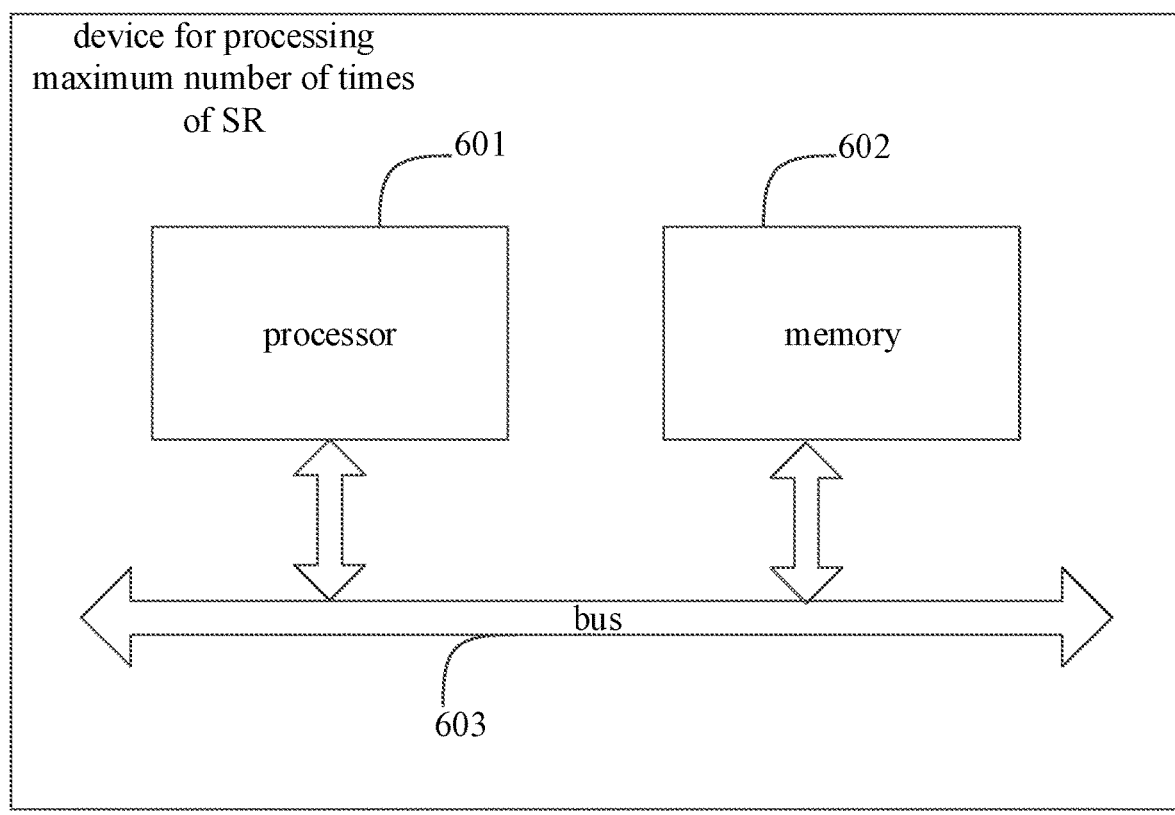
FIG. 6 is a diagram illustrating structure of a device for processing an SR according to an embodiment of the present disclosure.

FIG. 6 is a schematic diagram illustrating a device for processing an SR according to an embodiment of the present disclosure.

Referring to FIG. 6, the device includes: a processor 601, a memory 602 and a bus 603.

The processor 601 and the memory 602 communicate with each other via the bus 603.

Referring to FIG. 6, according to a ninth embodiment of the present disclosure, the processor 601 is used to call program instructions in the memory 602 to execute the method provided by the above each method embodiment, such as including: configuring different SR parameters for different logical channels/logical channel groups based on the logical channels/logical channel groups; or configuring different SR parameters for different numerologies/Transmission Time Interval (TTI) types based on the numerologies/TTI types, for a User Equipment (UE) to detect whether the SR count of the different logical channels/logical channel groups/numerologies/TTI types reaches maximum numbers of times of SR transmission.

According to the ninth embodiment of the present disclosure, a computer program product is further disclosed. The computer program product includes computer programs stored in a non-transient computer-readable storage medium. The computer programs include program instructions and when the program instructions are executed by the computer, the computer can perform the methods provided by the above each method embodiment, including: configuring different SR parameters for different logical channels/logical channel groups based on the logical channels/logical channel groups; or configuring different SR parameters for different numerologies/Transmission Time Interval (TTI) types based on the numerologies/TTI types, for a User Equipment (UE) to detect whether SR count of the different logical channels/logical channel groups/numerologies/TTI types reaches maximum numbers of times of SR transmission.

According to the ninth embodiment of the present disclosure, a non-transient computer readable storage medium is further provided. The non-transient computer readable storage medium stores computer instructions that cause the computer to execute the methods provided by the above each method embodiment, such as including: configuring different SR parameters for different logical channels/logical channel groups based on the logical channels/logical channel groups; or configuring different SR parameters for different numerologies/Transmission Time Interval (TTI) types based on the numerologies/TTI types, for a User Equipment (UE) to detect whether SR count of the different logical channels/logical channel groups/numerologies/TTI types reaches maximum numbers of times of SR transmission.

Referring to FIG. 6, according to a tenth embodiment of the present disclosure, the processor 601 is used to call program instructions in the memory 602 to execute the methods provided by the above each method embodiment, such as including: as for a current logical channel/logical channel group/numerology/TTI type, when detecting that SR count reaches the maximum number of times of SR transmission of the current logical channel/logical channel group/numerology/TTI type, releasing Physical Uplink Control Channel (PUCCH) resources on the numerology/TTI type corresponding to the current SR; when Sounding Reference Signal (SRS) resources are configured on the numerology/TTI type corresponding to the current SR, releasing the SRS resources; when downlink allocation and/or uplink grant resources are configured on the numerology/TTI type corresponding to the current SR, releasing the downlink allocation and/or uplink grant resources.

According to the tenth embodiment of the present disclosure, a computer program product is further disclosed. The computer program product includes computer programs stored in a non-transient computer-readable storage medium. The computer programs include program instructions and when the program instructions are executed by the computer, the computer can perform the methods provided by the above each method embodiment, including: as for a current logical channel/logical channel group/numerology/TTI type, when detecting that SR count reaches the maximum number of times of SR transmission of the current logical channel/logical channel group/numerology/TTI type, releasing Physical Uplink Control Channel (PUCCH) resources on the numerology/TTI type corresponding to the current SR; when Sounding Reference Signal (SRS) resources are configured on the numerology/TTI type corresponding to the current SR, releasing the SRS resources; when downlink allocation and/or uplink grant resources are configured on the numerology/TTI type corresponding to the current SR, releasing the downlink allocation and/or uplink grant resources.

According to the tenth embodiment of the present disclosure, a non-transient computer readable storage medium is further provided. The non-transient computer readable storage medium stores computer instructions that cause the computer to execute the methods provided by the above each method embodiment, such as including: as for a current logical channel/logical channel group/numerology/TTI type, when detecting that SR count reaches the maximum number of times of SR transmission of the current logical channel/logical channel group/numerology/TTI type, releasing Physical Uplink Control Channel (PUCCH) resources on the numerology/TTI type corresponding to the current SR; when Sounding Reference Signal (SRS) resources are configured on the numerology/TTI type corresponding to the current SR, releasing the SRS resources; when downlink allocation and/or uplink grant resources are configured on the numerology/TTI type corresponding to the current SR, releasing the downlink allocation and/or uplink grant resources.

Referring to FIG. 6, according to an eleventh embodiment of the present disclosure, the processor 601 is used to call program instructions in the memory 602 to execute the methods provided by the above each method embodiment, such as including: as for a current logical channel/logical channel group/numerology/TTI type, when detecting that SR count reaches the maximum number of times of SR transmission of the current logical channel/logical channel group/numerology/TTI type, transmitting a current SR on SR resources on other numerologies/TTI types, to which the current SR is applicable; wherein the SR resources on other numerologies/TTI types, to which the current SR is applicable, include SR resources on all numerologies/TTI types, to which services corresponding to the current SR are applicable, on other logical channels/logical channel groups.

According to the eleventh embodiment of the present disclosure, a computer program product is further disclosed. The computer program product includes computer programs stored in a non-transient computer-readable storage medium. The computer programs include program instructions and when the program instructions are executed by the computer, the computer can perform the methods provided by the above each method embodiment, including: as for a current logical channel/logical channel group/numerology/TTI type, when detecting that the SR count reaches the maximum number of times of SR transmission of the current logical channel/logical channel group/numerology/TTI type, transmitting a current SR on SR resources on other numerologies/TTI types, to which the current SR is applicable; wherein the SR resources on other numerologies/TTI types, to which the current SR is applicable, include SR resources on all numerologies/TTI types, to which the services corresponding to the current SR are applicable, on other logical channels/logical channel groups.

According to the eleventh embodiment of the present disclosure, a non-transient computer readable storage medium is further provided. The non-transient computer readable storage medium stores computer instructions that cause the computer to execute the methods provided by the above each method embodiment, such as including: as for a current logical channel/logical channel group/numerology/TTI type, when detecting that the SR count reaches the maximum number of times of SR transmission of the current logical channel/logical channel group/numerology/TTI type, transmitting a current SR on SR resources on other numerologies/TTI types, to which the current SR is applicable; wherein the SR resources on other numerologies/TTI types, to which the current SR is applicable, include SR resources on all numerologies/TTI types, to which services corresponding to the current SR are applicable, on other logical channels/logical channel groups.

It can be understood by those skilled in that art that all or part of the steps of the method embodiments can be implemented by the hardware instructed by the programs. The programs can be stored in the computer-readable storage medium. When the programs are executed, steps in the above method embodiments are executed. The storage medium includes various kinds of mediums, which may store the programs, such as a Read Only Memory (ROM), a Random Access Memory (RAM), a disk, or CD-ROM, etc.

The embodiment of the device for processing the SR in the above described each embodiment is only illustrative. The units described above as separation units may or may not be physically separated, and the components displayed as the units may or may not be the physical units. The units can be located in one place or distributed to multiple network units. Some or all of the modules may be selected according to actual requirements to realize the purpose of the embodiments, which can be understood and implemented by an ordinary person skilled in the field of the present disclosure without creative works.

Through the description of the above embodiments, technicians in the field can clearly understand that each embodiment can be implemented by means of software plus the necessary common hardware platform, but also by means of hardware. On the basis of such an understanding, the technical scheme in essence or those contributing to the existing technology in embodiments of the present disclosure can be embodied in the form of software products. The computer software product may be stored in a storage medium, which may be a Read-Only Memory (ROM)/Random Access Memory (RAM), a disk or disc, etc., and include several instructions to enable a computer device (which can be a personal computer, server, or network-side device, etc.) to perform the method in each embodiment or some parts of the embodiments.

Finally, the methods in the present application are only preferred implementation schemes and are not used to limit the protection scope of the present disclosure. Any modification, equivalent replacement and improvement made within the spirit and principles of the present disclosure shall be covered by the protection scope of the present disclosure.

What is claimed is:

1. A method for processing a Scheduling Request (SR), performed by a user equipment (UE), comprising:
   detecting, by the UE, whether SR count reaches a maximum number of times of SR transmission of at least one of a numerology or TTI type corresponding to a current SR;
   releasing, by the UE, Physical Uplink Control Channel (PUCCH) resources, Sounding Reference Signal (SRS) resources and at least one of a downlink allocation resource or an uplink grant resources only on the at least one of the numerology or TTI type corresponding to the current SR when the UE detects that the SR count reaches the maximum number of times of SR transmission of the at least one of the numerology or TTI type corresponding to the current SR.

2. The method according to claim 1, further comprising:
   when detecting that the SR count reaches the maximum number of times of SR transmission of the at least one of the numerology or TTI type corresponding to the current SR, transmitting the current SR to a base station via a Random Access Channel (RACH) procedure on RACH resources of the at least one of the numerology or TTI type corresponding to the current SR.

3. The method according to claim 2, further comprising:
   when detecting that the SR count reaches the maximum number of times of SR transmission of the at least one of the numerology or TTI type corresponding to the current SR and there is no RACH resource on the at least one of the numerology or TTI type corresponding to the current SR, transmitting the current SR to the base station via first random resources or second random resources;
   wherein the first random resources include other randomly-selected RACH resources besides RACH resources on the at least one of the numerology or TTI type corresponding to the current SR;
   the second random resources include other RACH resources, which are randomly selected and accepted by at least one of a current logical channel or logical channel group, besides the RACH resources of the at least one of numerology or TTI type corresponding to the current SR.

4. The method according to claim 2, further comprising: selecting SR resources on a numerology or TTI type which are available for services corresponding to the current SR, from other logical channels or logical channel groups to transmit the current SR to the base station.

5. The method according to claim 3, wherein transmitting the current SR to the base station via the first random resources or the second random resources, comprises:
   when there is no RACH resource on the at least one of the numerology or TTI type corresponding to the current SR, obtaining the second random resources;
   when the second random resources are successfully obtained, transmitting the current SR to the base station via the second random resources;
   when the second random resources are failed to be obtained, obtaining the first random resources and transmitting the current SR to the base station via the first random resources.

6. The method according to claim 1, further comprising:
   when detecting that the SR count reaches the maximum number of times of SR transmission of the at least one of the numerology or TTI type corresponding to the current SR, selecting at least one of a specific logical channel or a logical channel group with a configured maximum number of times of SR transmission being less than the maximum number of times of SR transmission of the at least one of the numerology or TTI type, from at least one of other logical channels or logical channel groups configured with SR resources;
   transmitting the current SR to the base station via the SR resources of the at least one of the specific logical channel or logical channel group;
   wherein the SR resources of the at least one of the specific logical channel or logical channel group include SR resources on all numerologies or TTI types which are available for services corresponding to the current SR.

7. The method according to claim 6, wherein the at least one of the specific logical channel or logical channel group includes at least one of a first logical channel, a first logical channel group, a second logical channel, or a second logical channel group;
   at least one of the first logical channel or the second logical channel group includes at least one of a logical channel or logical channel group, which is randomly selected from at least one of the other logical channels or logical channel groups;
   at least one of the second logical channel or the second logical channel group includes at least one of a logical channel or a second logical channel group, which is selected from at least one of the other logical channels or logical channel groups and configured with a maximal maximum number of times of SR transmission.

8. The method according to claim 6, wherein transmitting the current SR to the base station via the SR resources of the at least one of the specific logical channel or logical channel group, comprises:
   transmitting the current SR to the base station via SR resources on one numerology or TTI type selected from SR resources on all numerologies or TTI types which are available for services corresponding to the current SR;
   when the number of times of SR retransmission reaches the maximum number of times of SR transmission of the one numerology or TTI type, transmitting the current SR to the base station via SR resources on another numerology or TTI type selected from SR resources on all numerologies or TTI types which are available for the services corresponding to the current SR, until all numerologies or TTI types which are available for the services corresponding to the current SR, reach the maximum numbers of times of SR transmission.

9. The method according to claim 8, further comprising:
   when all the numerologies or TTI types which are available for the services corresponding to the current SR, reach the maximum number of times of SR transmission, randomly selecting other RACH resources to transmit the SR.

10. The method according to claim 1, further comprising:
    when detecting that the SR count reaches the maximum number of times of SR transmission of the at least one of the numerology or TTI type corresponding to the current SR, selecting SR resources on a numerology or TTI type which are available for services corresponding to the current SR, from other logical channels or logical channel groups to transmit the current SR to the base station;

when all numerologies or TTI types which are available for the services corresponding to the current SR, reach the maximum numbers of times of SR transmission, randomly selecting other RACH resources to transmit the SR.

11. The method according to claim 1, wherein detecting whether SR count reaches a maximum number of times of SR transmission of at least one of a numerology or TTI type corresponding to the current SR, further comprises:

obtaining a maximum number of times of SR transmission configured by a base station for the at least one of the numerology or TTI type corresponding to the current SR;

determining whether the SR count of the at least one of the numerology or TTI type equals the maximum number of times of SR transmission configured for the at least one of the numerology or TTI type corresponding to the current SR;

when the SR count of the at least one of the numerology or TTI type corresponding to the current SR equals the maximum number of times of SR transmission configured for the at least one of the numerology or TTI type corresponding to the current SR, detecting that the SR count reaches the maximum number of times of SR transmission of the at least one of the numerology or TTI type.

12. A User Equipment (UE), comprising a processor and a memory, wherein the memory is configured to store programs and the processor calls the programs in the memory to execute steps of the method for processing the SR in claim 1.

13. A method for processing a Scheduling Request (SR), performed by a user equipment (UE), comprising:

detecting, by the UE, whether SR count reaches a maximum number of times of SR transmission of at least one of a numerology or TTI type corresponding to a current SR;

transmitting, by the UE, the current SR on SR resources on other numerologies or TTI types which are available for the current SR when the UE detects that the SR count reaches the maximum number of times of SR transmission of the at least one of the numerology or TTI type corresponding to the current SR;

wherein the SR resources on other numerologies or TTI types which are available for the current SR, include SR resources on all numerologies or TTI types which are available for services corresponding to the current SR, on other logical channels or logical channel groups.

14. The method according to claim 13, further comprising:

when all numerologies or TTI types which are available for the services corresponding to the current SR, reach the maximum numbers of times of SR transmission, randomly selecting other RACH resources to transmit the SR.

15. A User Equipment (UE) for processing a Scheduling Request (SR), comprising: a processor and a memory, wherein the memory is configured to store programs and the processor calls the programs in the memory to execute steps of the method for processing the SR in claim 13.

16. A method for processing a Scheduling Request (SR), performed by a base station, comprising:

performing one of the following operations:
configuring different SR parameters for different logical channels;
configuring different SR parameters for different logical channel groups;
wherein the SR parameter includes the maximum number of times of SR transmission and an SR prohibit timer;
wherein the configuring different SR parameters for different logical channels, comprises:
configuring a same SR parameter for logical channels of a same type and configuring different SR parameters for the logical channels of different types;
wherein the configuring different SR parameters for different logical channel groups, comprises:
as for UEs configured with logical channel groups, configuring a same SR parameter for logical channel groups of a same type and configuring different SR parameters for the logical channel groups of different types;
wherein the SR prohibit timer is configured to monitor SR signals transmitted in Physical Uplink Control Channel (PUCCH); when the SR prohibit timer expires, the SR is re-transmitted until reaching the maximum number of times of SR transmission.

17. The method according to claim 16, wherein the method further comprises:

configuring different or partially different SR parameters for different numerologies or TTI types used by the UE for transmission.

* * * * *